(12) United States Patent
Capriati et al.

(10) Patent No.: US 8,549,436 B1
(45) Date of Patent: Oct. 1, 2013

(54) VISUAL WEB SEARCH INTERFACE

(75) Inventors: Colin Capriati, St. Petersburg, FL (US); Ryan J. Krupnick, Odessa, FL (US)

(73) Assignee: RedZ, Inc., Tampa, FL (US)

(*) Notice: Subject to any disclaimer, the term of this patent is extended or adjusted under 35 U.S.C. 154(b) by 1172 days.

(21) Appl. No.: 12/062,716

(22) Filed: Apr. 4, 2008

Related U.S. Application Data

(60) Provisional application No. 60/933,018, filed on Jun. 4, 2007.

(51) Int. Cl.
*G06F 3/048* (2013.01)
*G06F 17/30* (2006.01)
*G06F 3/00* (2006.01)

(52) U.S. Cl.
USPC .................... 715/838; 715/834; 715/776

(58) Field of Classification Search
USPC .................................. 715/838, 776, 834
See application file for complete search history.

(56) References Cited

U.S. PATENT DOCUMENTS

| | | | |
|---|---|---|---|
| 5,428,735 A | 6/1995 | Kahl et al. | |
| 5,528,735 A | 6/1996 | Strasnick et al. | |
| 5,546,529 A | 8/1996 | Bowers et al. | |
| 5,555,354 A | 9/1996 | Strasnick et al. | |
| 5,632,009 A * | 5/1997 | Rao et al. | 715/201 |
| 5,670,984 A * | 9/1997 | Robertson et al. | 345/585 |
| 5,671,381 A | 9/1997 | Strasnick et al. | |
| 5,745,109 A | 4/1998 | Nakano et al. | |
| 5,819,286 A | 10/1998 | Yang et al. | |
| 5,835,094 A | 11/1998 | Ermel et al. | |
| 5,835,905 A * | 11/1998 | Pirolli et al. | 707/3 |
| 5,847,708 A | 12/1998 | Wolff | |
| 5,870,559 A | 2/1999 | Leshem et al. | |
| 5,898,435 A | 4/1999 | Nagahara et al. | |
| 5,917,491 A | 6/1999 | Bauersfeld | |
| 5,956,033 A | 9/1999 | Tee et al. | |
| 5,977,974 A | 11/1999 | Hatori et al. | |
| 5,983,245 A | 11/1999 | Newman et al. | |
| 6,005,578 A | 12/1999 | Cole | |
| 6,054,989 A | 4/2000 | Robertson et al. | |
| 6,057,834 A | 5/2000 | Pickover | |
| 6,069,606 A | 5/2000 | Sciammarella et al. | |
| 6,070,176 A | 5/2000 | Downs et al. | |

(Continued)

FOREIGN PATENT DOCUMENTS

EP 1909195 A1 4/2008
JP 19960356888 12/1996

(Continued)

OTHER PUBLICATIONS

Holzman, TG. "Page Flipping for User Interfaces." IBM Technical Disclosure Bulletin. Aug. 1993. pp. 237-240. vol. 36. Pub. No. 8. Atlanta.

(Continued)

*Primary Examiner* — Jordany Nunez
(74) *Attorney, Agent, or Firm* — Anton J. Hopen; Andriy Lytvyn; Smith & Hopen, P.A.

(57) ABSTRACT

Displaying search query records as moveable thumbnail objects in a flip page metaphor whereby mouse-dragging on a first axis pages the objects from background to foreground, a mouse-down event over an object fires an event to retrieve data at a uniform resource location associated with the object.

23 Claims, 8 Drawing Sheets

(56) References Cited

U.S. PATENT DOCUMENTS

| | | | |
|---|---|---|---|
| 6,121,969 A | 9/2000 | Jain et al. | |
| 6,223,145 B1 | 4/2001 | Hearst | |
| 6,243,089 B1 | 6/2001 | Gong | |
| 6,271,840 B1 | 8/2001 | Finseth et al. | |
| 6,271,842 B1 | 8/2001 | Bardon et al. | |
| 6,297,824 B1 | 10/2001 | Hearst et al. | |
| 6,313,855 B1 | 11/2001 | Shuping et al. | |
| 6,349,295 B1 | 2/2002 | Tedesco et al. | |
| 6,353,448 B1 | 3/2002 | Scarborough et al. | |
| 6,452,609 B1 | 9/2002 | Katinsky et al. | |
| 6,463,428 B1 | 10/2002 | Lee et al. | |
| 6,466,237 B1* | 10/2002 | Miyao et al. | 715/838 |
| 6,473,751 B1 | 10/2002 | Nikolovska et al. | |
| 6,486,895 B1* | 11/2002 | Robertson et al. | 715/776 |
| 6,505,194 B1 | 1/2003 | Nikolovska et al. | |
| 6,535,888 B1 | 3/2003 | Vijayan et al. | |
| 6,556,226 B2 | 4/2003 | Gould et al. | |
| 6,567,103 B1 | 5/2003 | Chaudhry | |
| 6,613,100 B2 | 9/2003 | Miller | |
| 6,628,313 B1 | 9/2003 | Minakuchi et al. | |
| 6,864,904 B1 | 3/2005 | Ran et al. | |
| 6,880,132 B2 | 4/2005 | Uemura | |
| 6,922,815 B2 | 7/2005 | Rosen | |
| 6,938,218 B1 | 8/2005 | Rosen | |
| 6,961,731 B2 | 11/2005 | Holbrook | |
| 6,985,898 B1 | 1/2006 | Ripley et al. | |
| 7,003,737 B2 | 2/2006 | Chiu et al. | |
| 7,013,435 B2 | 3/2006 | Gallo et al. | |
| 7,031,968 B2 | 4/2006 | Kremer et al. | |
| 7,039,647 B2* | 5/2006 | Lowe et al. | 707/102 |
| 7,047,502 B2 | 5/2006 | Petropoulos et al. | |
| 7,051,291 B2 | 5/2006 | Sciammarella et al. | |
| 7,054,870 B2 | 5/2006 | Holbrook | |
| 7,065,520 B2 | 6/2006 | Langford | |
| 7,069,518 B2* | 6/2006 | Card et al. | 715/776 |
| 7,107,549 B2 | 9/2006 | Deaton et al. | |
| 7,134,092 B2 | 11/2006 | Fung et al. | |
| 7,137,075 B2 | 11/2006 | Hoshino et al. | |
| 7,162,493 B2 | 1/2007 | Weiss et al. | |
| 7,174,513 B1 | 2/2007 | Nickum | |
| 7,177,948 B1 | 2/2007 | Kraft et al. | |
| 7,200,820 B1 | 4/2007 | Stephens | |
| 7,383,503 B2* | 6/2008 | Banks | 715/273 |
| 7,664,739 B2* | 2/2010 | Farago et al. | 707/722 |
| 2002/0129114 A1 | 9/2002 | Sundaresan et al. | |
| 2002/0152222 A1 | 10/2002 | Holbrook | |
| 2002/0163545 A1 | 11/2002 | Hii | |
| 2003/0144996 A1 | 7/2003 | Moore, Jr. | |
| 2003/0164827 A1 | 9/2003 | Gottesman et al. | |
| 2004/0034629 A1* | 2/2004 | Genser | 707/3 |
| 2005/0086612 A1 | 4/2005 | Gettman et al. | |
| 2005/0144158 A1 | 6/2005 | Capper et al. | |
| 2005/0149500 A1 | 7/2005 | Marmaros et al. | |
| 2005/0210416 A1 | 9/2005 | MacLaurin et al. | |
| 2006/0048076 A1* | 3/2006 | Vronay et al. | 715/850 |
| 2006/0095424 A1 | 5/2006 | Petropoulos et al. | |
| 2006/0155684 A1 | 7/2006 | Liu et al. | |
| 2006/0271884 A1 | 11/2006 | Hurst | |
| 2006/0277167 A1 | 12/2006 | Gross et al. | |
| 2007/0011617 A1 | 1/2007 | Akagawa et al. | |
| 2007/0073833 A1 | 3/2007 | Roy et al. | |
| 2007/0074125 A1 | 3/2007 | Platt et al. | |
| 2007/0174790 A1 | 7/2007 | Jing et al. | |
| 2007/0266001 A1 | 11/2007 | Williams et al. | |
| 2007/0276820 A1 | 11/2007 | Iqbal | |
| 2008/0027928 A1 | 1/2008 | Larson | |
| 2008/0034381 A1 | 2/2008 | Jalon et al. | |
| 2008/0046218 A1 | 2/2008 | Dontcheva et al. | |
| 2008/0072166 A1 | 3/2008 | Reddy | |
| 2008/0086688 A1 | 4/2008 | Chandratillake et al. | |
| 2008/0120290 A1 | 5/2008 | Delgo et al. | |
| 2008/0133748 A1 | 6/2008 | Nicholas | |
| 2010/0083155 A1* | 4/2010 | Farago et al. | 715/769 |
| 2010/0131881 A1* | 5/2010 | Ganesh | 715/769 |
| 2010/0223257 A1* | 9/2010 | Milic-Frayling et al. | 707/722 |

FOREIGN PATENT DOCUMENTS

| | | |
|---|---|---|
| JP | 2000339258 A2 | 8/2000 |
| JP | 20020111439 | 4/2002 |
| JP | 2003132092 | 5/2003 |
| JP | 2003132092 A | 9/2003 |
| JP | 2005196288 A2 | 7/2005 |
| WO | 9910819 A1 | 4/1999 |
| WO | 0067161 A3 | 11/2000 |
| WO | 0077681 A1 | 12/2000 |
| WO | 0041095 A3 | 2/2001 |
| WO | 0205108 A2 | 1/2002 |
| WO | 02061610 A1 | 8/2002 |

OTHER PUBLICATIONS

Alexa.com <http://www.alexa.com/search> Alexa. 2008.
Baba, M. and Miyashita, S. "Method for Searching Multiple Compact Disk-Read Only Memory Dictionaries." IBM Technical Disclosure Bulletin. Aug. 1996. pp. 211-212. vol. 39, Pub. No. 8, Japan.
Boeving, R.D., Gupta, A., Hawks, L.A., and Maeker, B.J. "Public Search Lists on OS/2 Office Address Book." IBM Technical Disclosure Bulletin. Nov. 1992. pp. 323-324. Pub. No. 6. Dallas.

* cited by examiner

VISUAL WEB SEARCH INTERFACE

PRIORITY CLAIM

This application claims priority from U.S. Provisional Patent Application Ser. No. 60/933,018 filed Jun. 4, 2007 and titled "Image-Based, Single-Page Rotational Navigation of Search Engine Results."

FIELD OF INVENTION

This invention relates to user interface methods, and more particularly to a user interface for displaying thumbnail images of a plurality of records returned by a search query.

SUMMARY OF INVENTION

The present invention is a novel method for displaying search query records as moveable thumbnail objects. The thumbnail is a small graphic rendering of the visual appearance of the object itself. In the case of a website, it may be the HTML content a specific website page rendered as would be viewed in a browser. In the case of a document it may be a rendering of the first page or slide.

Mouse events invoke motion-based paging of the objects within a graphic user interface. Motion-based paging refers to animation applied to the thumbnail objects and not to the scrolling motion inherent in many operating systems' graphic user interface (i.e., using a mouse's scrolling wheel).

The objects may be displayed as a horizontal or vertical flip page metaphor. The flip page metaphor may be defined as graphically invoking the pagination and perspective of flipping through a book or a stack of records. More specifically, as objects come to the foreground from the background, those objects are enlarged and partially overlap the objects in the background.

In an embodiment of the invention, the paging is completely cyclic wherein the objects form an infinite loop. Cycling in one direction increments the records until the very last record is shown. Continued cycling in the same direction returns the first record after the last record. Alternatively, the records may be presented linearly wherein at the first record paging can only be invoked in one direction. Between the first and last records, paging can be invoked in two directions. At the last record, paging can only be invoked in one direction.

In an embodiment of the invention, a mouse event (single-click, double-click, mouse-down, mouse-down over elapsed time, or the like) over a foreground object fires an event to retrieve data at a uniform resource location associated with the object. The object does not necessary need to be the foreground object. Actuating the mouse event over an exposed portion of a partially overlapped object may also fire the same event.

A particular advantage of the present invention is the combination of visual metaphors for presenting search query results in conjunction with visual manipulation of individual search query return records. For example, in an embodiment of the invention displaying a cyclic flip page metaphor, the thumbnail objects rotate around a semi-circular path. However, actuating a preselected user input such as a mouse-dragging event on a different axis than that used to cycle the objects "undocks" the object from the flip page metaphor. Once undocked, the object may be dragged and dropped to user selected locations within the graphic user interface. Addition events are then fired related to the object such as query refinement, bookmarking, opening a uniform resource location, adding the object to an array, ranking the object, or the like.

An embodiment of the present invention may be used to display records chronologically or version history. For example, search results at <www.archive.org> display hyperlink for cached versions of websites at specific dates. A user must click on each individual link to view the pages and observe the evolution of a website. However, the present invention includes presenting these versions chronologically in the flip page metaphor whereby the user can seamlessly view how the website changed over time by its thumbnail rendering.

Yet another embodiment of the invention may be deployed on social networking sites such as MYSPACE or FACEBOOK. Instead of thumbnailing documents or HTML renderings, thumbnail objects show the identity of users for communication and messaging purposes. For example, photos or avatars are rendered as thumbnail indicia representations of individual network users. Those users, rendered as thumbnail objects may be more readily accessible for executing various messaging events such as chat, email or video conferencing.

Yet another embodiment of the invention opens selected thumbnail objects within a new tab window in the graphic user interface while the query return records are maintained in an alternate tab thereby providing state for the user's activities.

In an alternative embodiment of the invention, a plurality of drop areas are dynamically generated responsive to the search query records returned. The search query records are analyzed and a plurality of common attributes between subgroups of the search query records are generated. For example, if a search query for "ham" returned query records relating to ham radio and also to ham as a meat product, at least two drop area would be generated, a first drop area would invoke events to refine the query to "ham radio" and a second drop area would invoke events to refine the query to "ham (the meat)."

More specifically, a classification data is provided that generates a plurality of species terms resolved from a keyword query, the species terms present in an individual record are rendered with the moveable thumbnail object whereby a search query may be refined by selecting or deselecting at least one species term. For example, a search query for the term "fruit" would generate an array of species terms such as "apple, orange, and banana."

However, while the user may be interested in oranges in bananas, he has no interest in apples. When a simple keyword query is returned, it is very likely that the resource returned, whether it be a website, document or presentation will not only have the keyword "fruit" but also expressly enumerate at least one type of fruit. Thus, the present invention searches for the species terms within the individual record. If a match is found, the user is graphically presented with a trigger to further refine the search by requiring the species term be present or requiring the species term be absent. A more practical example might start off with a keyword search for "gambling." This would typically return a large number of resources for an Internet website search. However, if the species derived from the "gambling" term included both "gaming websites" and "gambling addiction" the end user could dramatically refine the search query with a single mouse-click.

Species terms may be prioritized on the frequency of appearance within a given query by another population of terms.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
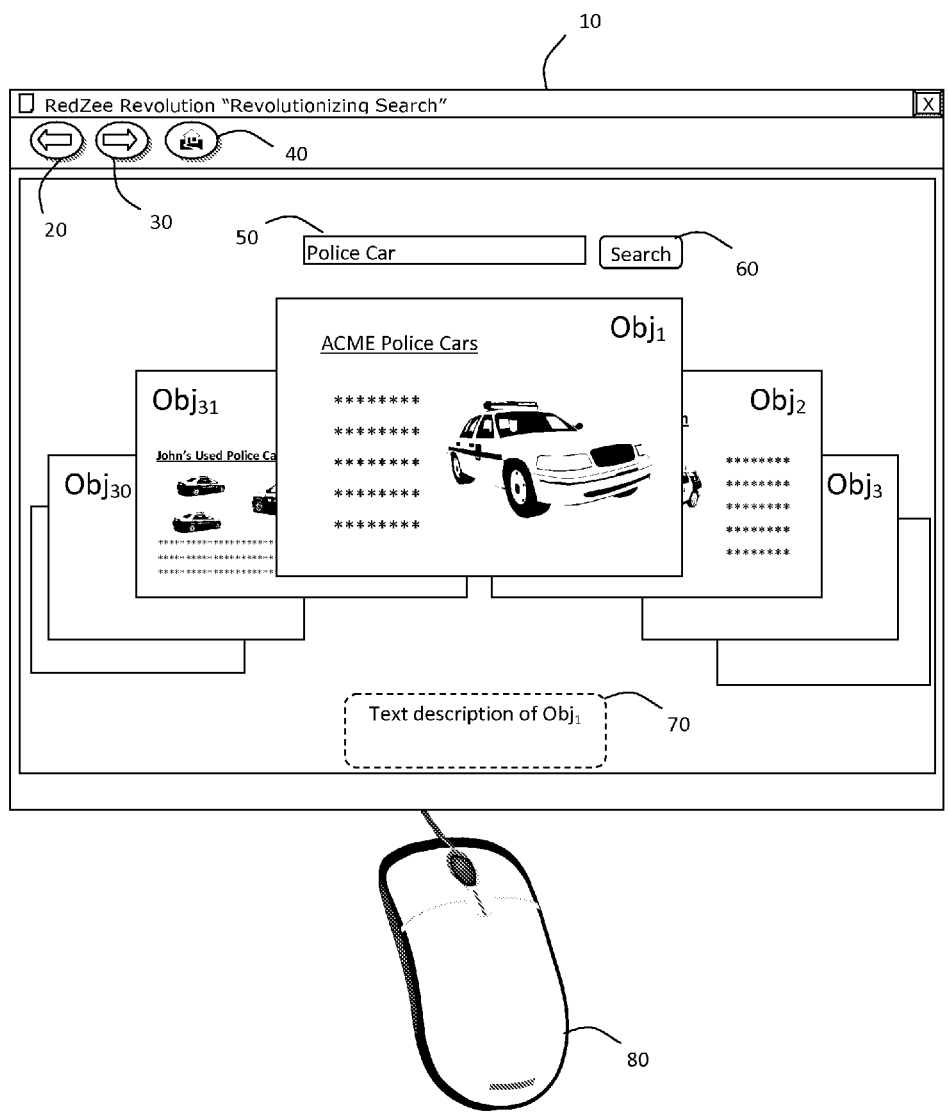
FIG. 1 is a graphic user interface according to an exemplary embodiment of the invention showing the first record in a keyword search for "police car."

Turning to FIG. 1, Graphic User Interface 10 is shown as a generic web browsing application with Back Button 20, Forward Button 30 and Home Button 40. Search Query Text Box 50 contains an exemplary search query of "Police Car" which upon actuating Search Query Button 60 returns a plurality of records designated $Obj_{1-31}$. $Obj_1$ shows a thumbnail image of a website entitled "ACME Police Cars" complete with text and an image. This thumbnail image is typically pre-rendered and stored in an image database. On a relatively simple level, the image file is associated with the URL of the website itself in addition to a short description of the website contents. The description may be resolved from meta tags embedded in the website HTML code or may be generated by some other means as known in the art. It should be noted that the website search query is only one example of the invention. The same functionality may be paralleled in a document search. Thumbnail images may be rendered of the first page in a document or presentation. The short description of the document may be derived from meta data within the document's particular specification.

It can be seen in FIG. 1 that $Obj_1$ is the largest window out of seven (7) that are viewable. In addition, $Obj_1$ is centered in the foreground and is the only thumbnail object that is not overlapped by another thumbnail object. Foreground Object Text Description Label 70 displays the meta tag data associated with the URL displayed as $Obj_1$. It can been seen in this example that five (5) thumbnail objects are identified, from left to right they are $Obj_{30}$, $Obj_{31}$, $Obj_1$, $Obj_2$, and $Obj_3$. As disclosed in the Summary of Invention above, an embodiment of the invention may present the moveable thumbnail objects in a cyclic arrangement or an infinite loop of 31 records in this case. In the event the end user has exhausted the 31 records and seeks addition records, an "acquire more records" procedure may be provided to query the search engine again to either append more records to the first 31 retrieved, or to replace the first 31 records retrieved with a new set.

Figure 2:
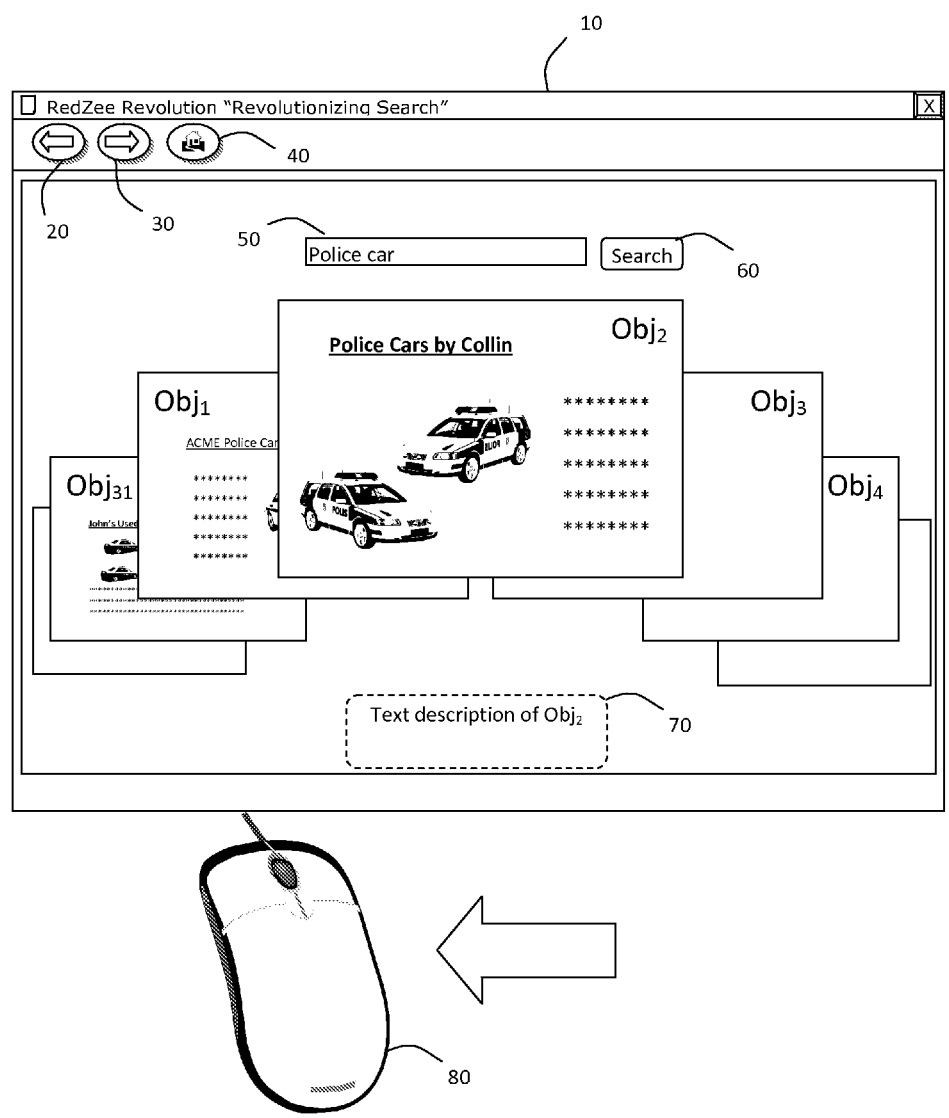
FIG. 2 is a graphic user interface according to an exemplary embodiment of the invention showing the second record in a keyword search for "police car" responsive to a left mouse movement.

Pointing Device 80 controls the movement of the thumbnail objects relative to each other. In FIG. 2, Pointing Device 80 is moved to the left. This causes $Obj_2$ to move leftward to the center foreground position on the GUI. $Obj_1$ is reduced in size and is now overlapped partially by $Obj_2$. Foreground Object Text Description Label 70 updates to reflect the description for $Obj_2$. In one embodiment of the invention, a combination of Pointing Device 80 movement and a mouse-down event fire the procedure to cycle the thumbnails from background to foreground. An advantage of requiring a mouse-down even is that the user may need to manipulate other objects on the GUI such as modifying Search Query Text Box 50 without cycling the thumbnail objects. Another advantage of using a mouse down event is that is potentially gives additional control for the end user.

For example, a first X-axis coordinate is noted when the mouse-down event occurs. User then maintains a mouse-down condition and moves the mouse left to cycle the thumbnail objects in a counter-clockwise rotation. As the difference (a negative value) in current X-axis coordinate increases relative to the first X-axis coordinate noted at the start, the speed of counter-clockwise rotation increases. As the end user moves the mouse on the X-axis to the right and thus back to the first X-axis coordinate, the speed of counter-clockwise rotation decreases. When the current X-axis coordinate and the first X-axis coordinate are the same, the cyclic motion ceases.

Alternatively, instead of controlling the speed at which the thumbnail objects cycle, the X-axis coordinates may be linearly associated with the number of records returned in the search. For example, if 31 records are returned, the present invention may cycle the thumbnail objects from background to foreground as Pointing Device 80 moves five pixels along the X-axis. Thus, as shown in FIG. 2, end user presses down and holds a mouse button on Pointing Device 80 to activate the cycling procedure. Moving the mouse to the left an equivalent of 5 pixels on the screen brings $Obj_2$ to the foreground and moves $Obj_1$ to the background counterclockwise. Moving the mouse to the left an equivalent of 10 pixels on the screen brings $Obj_3$ to the foreground. Moving the mouse to the left an equivalent of 25 pixels on the screen brings $Obj_6$ to the foreground.

Still yet another alternative is to "slide show" the thumbnail objects as they cycle in either clockwise or counterclockwise rotation at a relatively constant rate. When the end user observe a record of interest, he may select that thumbnail object to fire addition events to view, record or refine the search query based on the selection.

Figure 3:
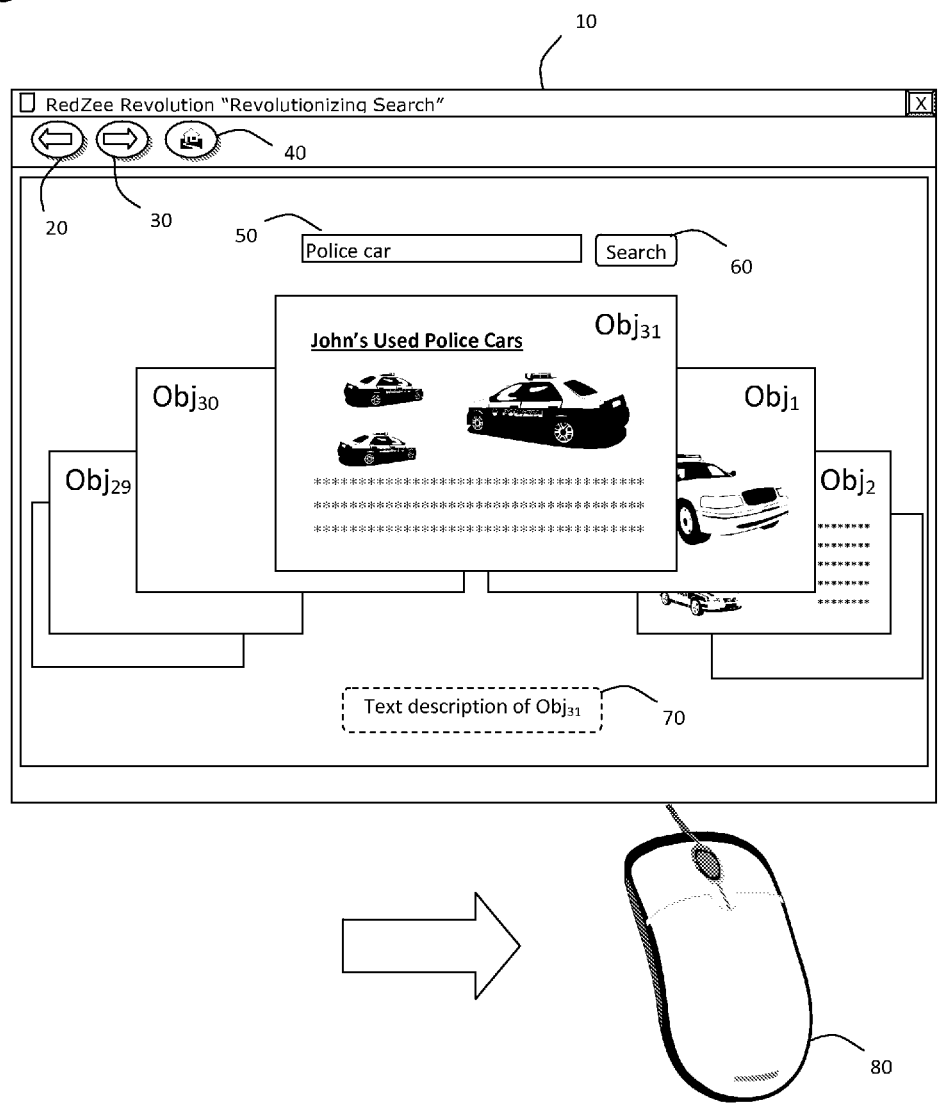
FIG. 3 is a graphic user interface according to an exemplary embodiment of the invention showing the thirty first record in a keyword search for "police car" responsive to a right mouse movement.

In FIG. 3, Pointing Device 80 is moved to the right which causes $Obj_{31}$ to move from the background to the foreground in clockwise rotation. $Obj_1$ moves to the background and is partially overlapped by $Obj_{31}$. Foreground Object Text Description Label 70 is updated to the description associated with $Obj_{31}$. It should be noted that while the user is moving Pointing Device 80 on an X-axis and the flip page metaphor shown is substantially horizontal, the present invention anticipates and herein discloses a vertically oriented flip page metaphor wherein movement of the thumbnail objects are invoked by moving Pointing Device 80 on a Y-axis.

For web browser applications, the present invention anticipates the use of asynchronous updating of search query requests in addition to other processing and events. Data is retrieved using the XMLHttpRequest object that is available to scripting languages run in modern browsers, or alternatively Remote Scripting in browsers that do not support XMLHttpRequest.

Figure 4:
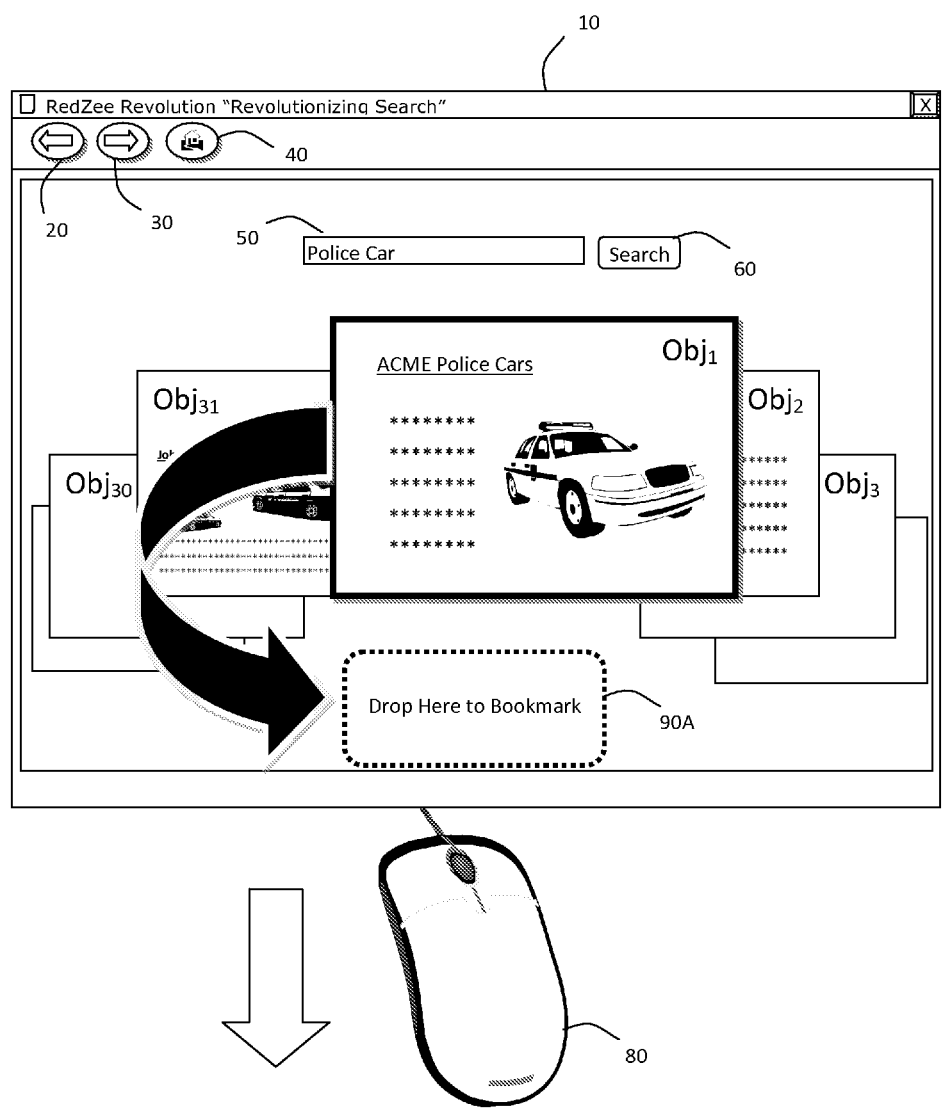
FIG. 4 is a graphic user interface according to an exemplary embodiment of the invention showing a book-marking function responsive to a down mouse movement.

FIG. 4 shows an alternative embodiment of the invention wherein movement of Pointing Device 80 on a Y-axis "undocks" thumbnail object $Obj_1$ from the foreground. Undocked $Obj_1$ may be repositioned about the GUI. In the example, shown, Drop Area 90A fires a bookmark event for any thumbnail object dropped within the boundaries. The bookmark event is purely illustrative of many other events that can be invoked. A user may undock the thumbnail object along with others to simply set it assign as a possible resource for addition exploration. While not all web browsers support scripted bookmarking, many could maintain the state of the selection with a cookie or even on the server-side by user login or some other type of authentication. Thus, this alternative embodiment of the invention cycles thumbnail objects using Pointing Device 30 movement on a first axis, and undocks the thumbnail object for additional events by Pointing Device 30 movement on a second axis.

Figure 5:
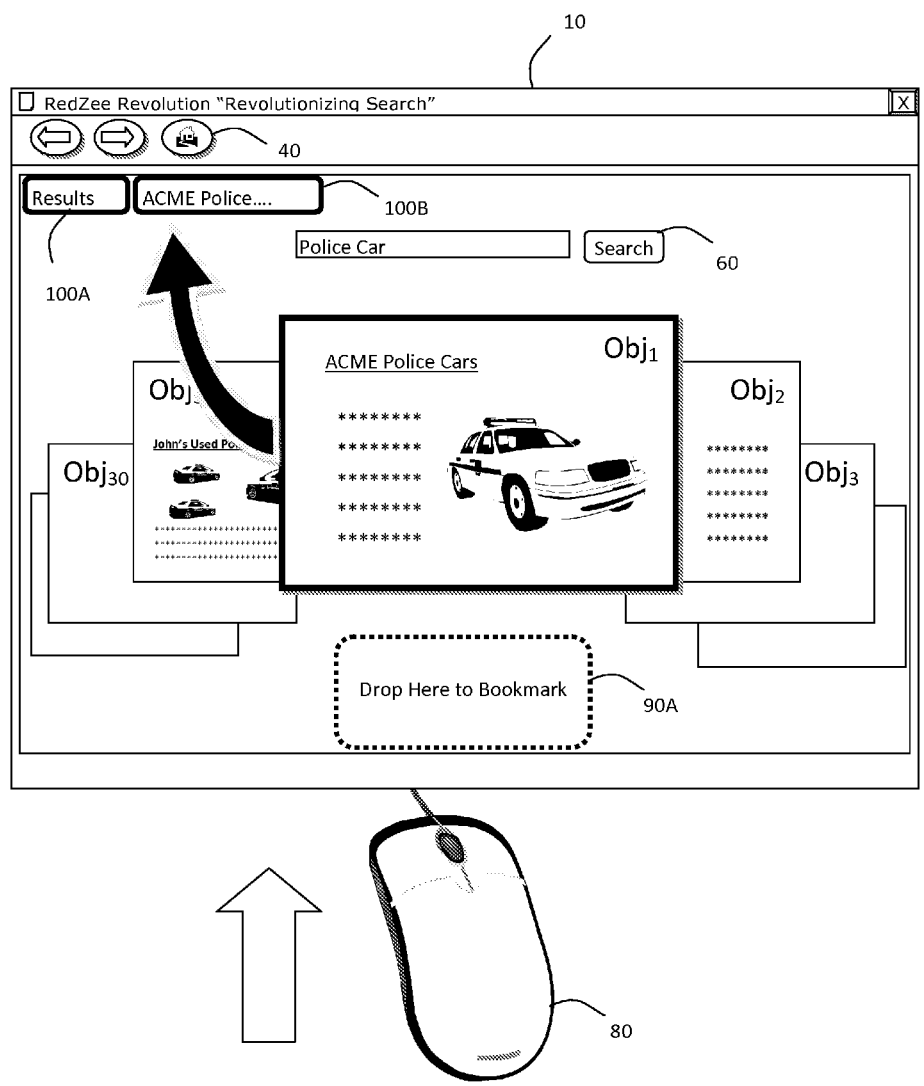
FIG. 5 is a graphic user interface according to an exemplary embodiment of the invention showing a tab window function responsive to a up mouse movement.

In FIG. 5, selection of $Obj_1$ in the foreground generates object Tab 100B within the GUI. As mouse-down events may be required for cycling of the thumbnail objects, a double-click mouse event may be assigned to open the thumbnail object's URL. For web browsers, this functionally is supported through asynchronous Javascript. Upon selection of $Obj_1$, Results Tab 100A also appears. Selection of Tab 100B displays the full content of the $Obj_1$ URL. However, even while viewing the $Obj_1$ website, Results Tab 100A is still maintained at the top of the GUI content window. As additional thumbnail objects are selected, additional tabs 100 are generated. Therefore, the user may return back to the query results by selecting Results Tab 100A without having to reload or reinstitute the same search.

Figure 6:
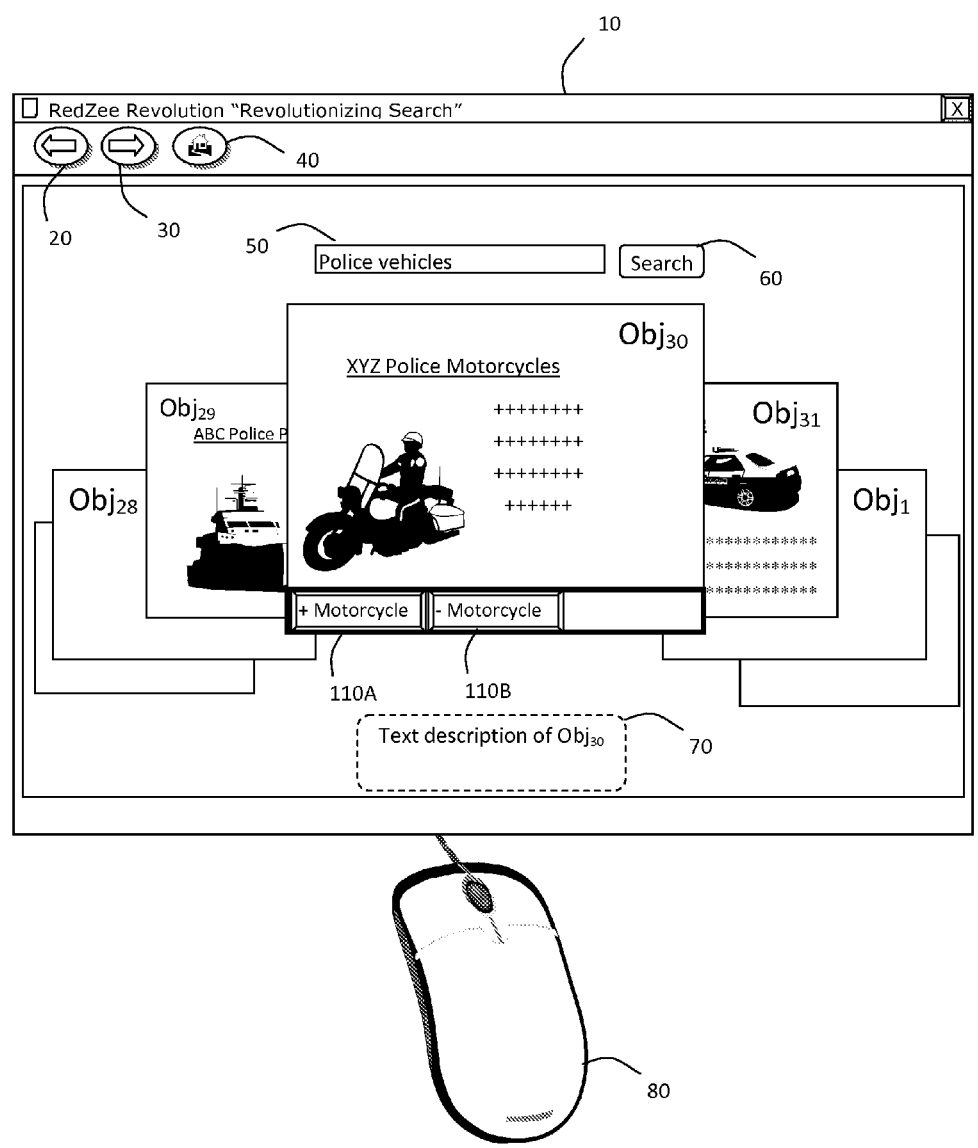
FIG. 6 is a graphic user interface according to an exemplary embodiment of the invention showing a plurality of search query refinement buttons for the term "motorcycle."

In FIG. 6, the search query string in Search Query Text Box 50 is modified from "police car" to "police vehicles." A car falls within the classification of vehicles as does bicycles, helicopters, boats and motorcycles. Furthermore, within the search term "police" fall both military and civilian police. In the example in FIG. 6, the query for "police vehicles" returned records related to police boats, police motorcycles and police cars. Prior to displaying the thumbnail object, the present invention cross-references the array of species within the general class of vehicles against keywords actually present in each individual record. $Obj_{30}$ contains information on motorcycles while $Obj_{29}$ contains information about boats and $Obj_{31}$ contains information about cars. Thus, as shown by foreground $Obj_{30}$, two buttons are shown immediately under the thumbnail object: Query Refinement Selection 110A labeled "+Motorcycle"; and Query Refinement Selection 110B labeled "−Motorcycle."

Figure 7:
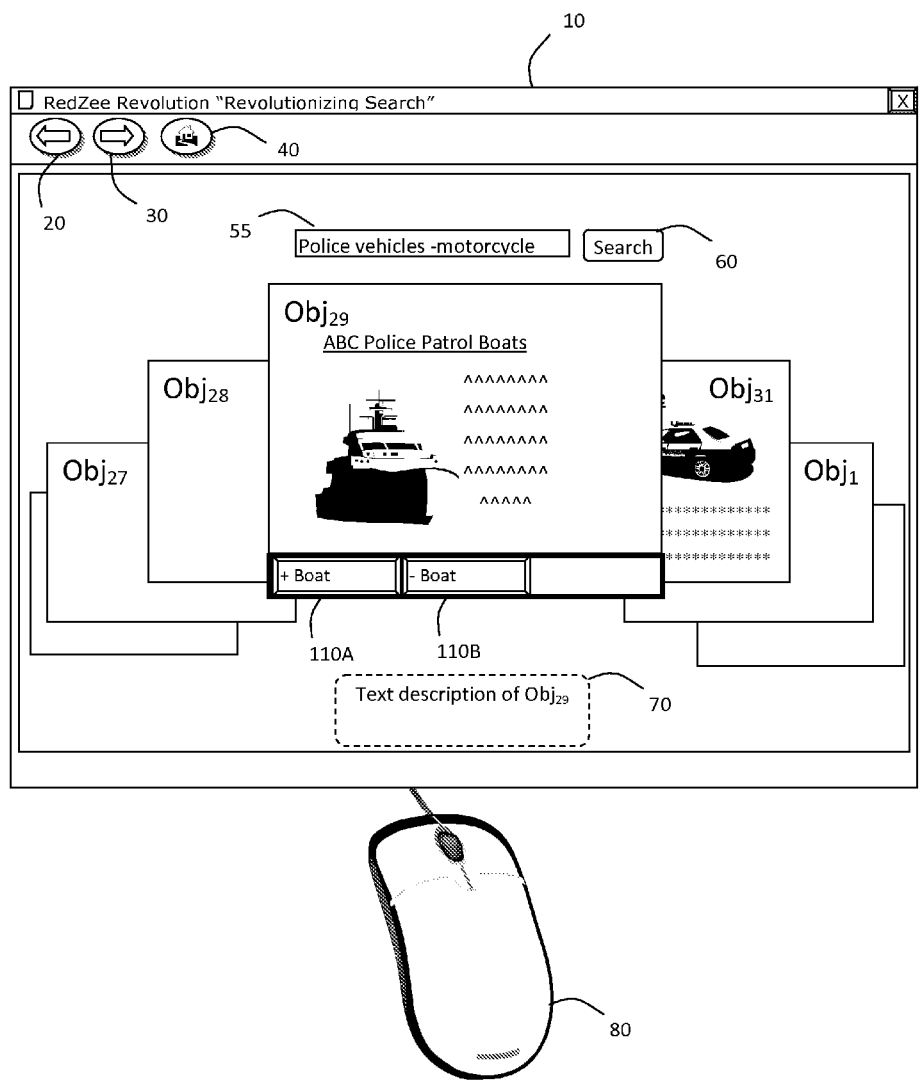
FIG. 7 is a graphic user interface according to an exemplary embodiment of the invention showing a plurality of search query refinement buttons for the term "boat."

The end user has three options for query refinement: (1) take no action and let the current query for "Police vehicles" stand unchanged; (2) activate Query Refinement Selection 110A to modify the query to require the term "motorcycle" be present in the returned record; or (3) activate Query Requirement Selection 110B to modify the query to require the term "motorcycle" be absent from the returned record. Selecting Query Refinement Selection 110B revises the query as shown in Search Query Text Box with Automatically Refined Query 55 (FIG. 7). The new search query is "Police vehicles— motorcycle." An asynchronous update is sent to the search engine whereby thumbnail objects that contained the "motorcycle" keyword are removed. As seen in FIG. 7, $Obj_{30}$ is no longer present in the result set and $Obj_{29}$ has moved to the foreground. $Obj_{29}$ is displayed with new Query Refinement Selection 110A to require the term "boat" to exist in the returned record and Query Refinement Selection 110B to require the term "boat" to be absent from the returned record.

An advantage of the graphical query term refinement innovation is that it provides a layer of abstraction between the end user and complex search query terms. This substantially enhances the precision of a search and the end user is given immediate feedback on the query refinement.

Figure 8:
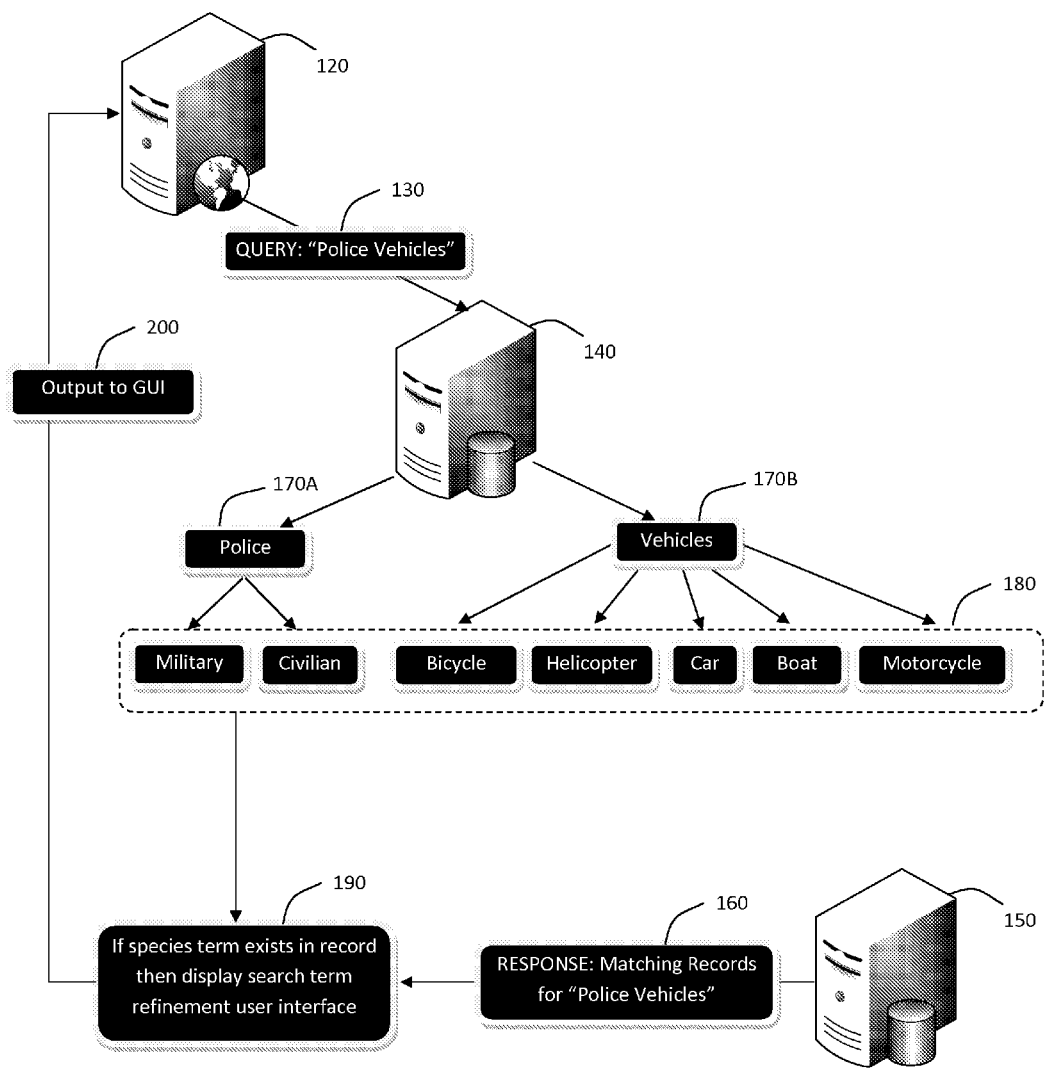
FIG. 8 is a diagrammatic view of an exemplary embodiment of the invention showing the generation of species terms from generic search keywords.

In FIG. 8, Web Server 120 receives Keyword Search Query 130 for "Police Vehicles." Species Keyword Database 140 segregates terms Police 170A and Vehicles 170B from composite Keyword Search Query 130. Derived Species Terms 180 are generated for Police 170A (military, civilian) and for Vehicles 170B (bicycle, helicopter, car, boat, motorcycle). Search Engine Database 150 returns records for Keyword Search Query 130. Species Keyword Query is applied against each record returned from Search Engine Database 150. Species Term Procedure 190 checks if any of the Derived Species Terms 180 exists. If one of Derived Species Terms 180 exists in Result Set 160 from Search Engine Database 150 then the Query Refinement Selection 110 with the species keyword is Output to GUI 200.

TERMS

10: Graphic User Interface (GUI)
20: Back Button
30: Forward Button
40: Home Button
50: Search Query Text Box
55: Search Query Text Box with Automatically Refined Query
60: Search Query Button
70: Foreground Object Text Description Label
80: Pointing Device
90: Drop Area
100: Tab
110: Query Refinement Selection
120: Web Server
130: Keyword Search Query
140: Species Keyword Database
150: Search Engine Database
160: Result Set
170: Keyword Search Term
180: Derived Species Terms
190: Species Term Procedure
200: Output of Query Records with Species Terms to GUI.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of providing a visual web search interface, the method comprising:
　determining a plurality of search query records from a search query;
　creating a first moveable thumbnail object representing one of the plurality of search query records;
　creating a second moveable thumbnail object representing one of the plurality of search query records;

creating a third moveable thumbnail object representing one of the plurality of search query records;

creating a flip-page metaphor in a graphical user interface, the flip-page metaphor having a foreground display position with at least one display position located on a first side of the foreground display position, and at least one background display position located on a second side of the foreground display position, wherein the at least one background display positions located on each side are cascaded such that the background display positions of each side radiate from the foreground display position, no overlap occurs between the background display positions of each side, and the foreground display position overlaps the first background display position of the first side and the first background display position of the second side;

displaying the first moveable thumbnail object in the foreground display position of the flip-page metaphor;

displaying the second moveable thumbnail object in the first background display position of the first side of the foreground display position of the flip-page metaphor;

displaying the third moveable thumbnail object in the first background display position of the second side of the foreground display position of the flip-page metaphor;

displaying the second moveable thumbnail object in the foreground display position and the first moveable thumbnail object in the first background display position of the second side of the foreground display position, responsive to movement of a mouse in a first direction along a first axis;

displaying the third moveable thumbnail object in the foreground display position and the first moveable thumbnail object in the first background display position of the first side of the foreground display position, responsive to movement of the mouse in a second direction along the first axis;

undocking a moveable thumbnail object from the flip-page metaphor responsive to mouse-dragging the object on a second axis that is substantially perpendicular to the first axis;

dragging and dropping an undocked moveable thumbnail object to user selected locations within the graphic user interface;

firing an event related to the moveable thumbnail object;

dynamically generating a plurality of drop areas responsive to the search query records returned; and modifying the search query itself responsive to moveable thumbnail objects being dropped into the drop areas.

2. The method of claim 1, further comprising retrieving data at a uniform resource location associated with the moveable thumbnail object located in the foreground responsive to a mouse-down event over the moveable thumbnail object located in the foreground display position.

3. The method of claim 1, wherein the plurality of search query records comprise a plurality of versions ordered chronologically.

4. The method of claim 3, wherein the moveable thumbnail object is representative of a specific version.

5. The method of claim 1, wherein the plurality of search query records comprise thumbnail indicia representations of individual network users.

6. The method of claim 2, further comprising:
maintaining the plurality of search query records within a first tab window in the GUI; and
displaying the retrieved data within a second tab window in the graphic user interface.

7. The method of claim 1, wherein the event is selected from the group consisting of book-marking a uniform resource location associated with the moveable thumbnail object, modifying a search query according to attributes associated with the moveable thumbnail object, and adding the moveable thumbnail object to an array.

8. The method of claim 1, further comprising:
analyzing the search query records;
generating a plurality of common attributes between subgroups of the search query records; and
dynamically generating the drop areas to include or exclude objects associated with the subgroups.

9. The method of claim 1, further comprising:
generating a plurality of species terms resolved from a keyword query;
rendering species terms present in an individual record with the moveable thumbnail object; and
refining the search query responsive to the selection or de-selection of at least one species term.

10. The method of claim 1, further comprising:
generating a plurality of species terms resolved from a keyword query;
rendering species terms as clickable buttons; and
refining the search query responsive to actuation of the buttons.

11. The method of claim 10, wherein rendering species terms as clickable buttons comprises:
rendering each species term as a first button to refine the search query to require the species term be present in the search query record; and
rendering each species term as a second button to refine the search query to require the species term to be absent in the search query record.

12. The method of claim 11, further comprising:
assigning a weight to each species term based on the frequency of the term's occurrence;
determining whether a species term should be rendered based on a comparison of its weight with the weight of the other species terms; and
rendering a species term responsive to the determination.

13. A method of providing a visual web search interface, the method comprising:
determining a plurality of search query records from a search query;
creating a first moveable thumbnail object representing one of the plurality of search query records;
creating a second moveable thumbnail object representing one of the plurality of search query records;
creating a third moveable thumbnail object representing one of the plurality of search query records;
creating a flip-page metaphor in a graphical user interface, the flip-page metaphor having a foreground display position with at least one display position located on a first side of the foreground display position, and at least one background display position located on a second side of the foreground display position, wherein the at least one background display positions located on each side are cascaded such that the background display positions of each side radiate from the foreground display position, no overlap occurs between the background display positions of each side, and the foreground display position overlaps the first background display position of the first side and the first background display position of the second side;
displaying the first moveable thumbnail object in the foreground display position of the flip-page metaphor;

displaying the second moveable thumbnail object in the first background display position of the first side of the foreground display position of the flip-page metaphor;

displaying the third moveable thumbnail object in the first background display position of the second side of the foreground display position of the flip-page metaphor;

displaying the second moveable thumbnail object in the foreground display position and the first moveable thumbnail object in the first background display position of the second side of the foreground display position, responsive to movement of a mouse in a first direction along a first axis;

displaying the third moveable thumbnail object in the foreground display position and the first moveable thumbnail object in the first background display position of the first side of the foreground display position, responsive to movement of the mouse in a second direction along the first axis;

undocking a moveable thumbnail object from the flip-page metaphor responsive to mouse-dragging the object on a second axis that is substantially perpendicular to the first axis;

dragging and dropping an undocked moveable thumbnail object to user selected locations within the graphic user interface;

firing an event related to the moveable thumbnail object;

dynamically generating a plurality of drop areas responsive to the search query records returned;

modifying the search query itself responsive to moveable thumbnail objects being dropped into the drop areas;

analyzing the search query records;

generating a plurality of common attributes between subgroups of the search query records; and dynamically generating the drop areas to include or exclude objects associated with the subgroups.

14. The method of claim 13, further comprising retrieving data at a uniform resource location associated with the moveable thumbnail object located in the foreground responsive to a mouse-down event over the moveable thumbnail object located in the foreground display position.

15. The method of claim 13, wherein the plurality of search query records comprise a plurality of versions ordered chronologically.

16. The method of claim 15, wherein the moveable thumbnail object is representative of a specific version.

17. The method of claim 13, wherein the plurality of search query records comprise thumbnail indicia representations of individual network users.

18. The method of claim 14, further comprising:
maintaining the plurality of search query records within a first tab window in the GUI; and
displaying the retrieved data within a second tab window in the graphic user interface.

19. The method of claim 13, wherein the event is selected from the group consisting of book-marking a uniform resource location associated with the moveable thumbnail object, modifying a search query according to attributes associated with the moveable thumbnail object, and adding the moveable thumbnail object to an array.

20. The method of claim 13, further comprising:
generating a plurality of species terms resolved from a keyword query;
rendering species terms present in an individual record with the moveable thumbnail object; and
refining the search query responsive to the selection or de-selection of at least one species term.

21. The method of claim 13, further comprising:
generating a plurality of species terms resolved from a keyword query;
rendering species terms as clickable buttons; and
refining the search query responsive to actuation of the buttons.

22. The method of claim 21, wherein rendering species terms as clickable buttons comprises:
rendering each species term as a first button to refine the search query to require the species term be present in the search query record; and
rendering each species term as a second button to refine the search query to require the species term to be absent in the search query record.

23. The method of claim 22, further comprising:
assigning a weight to each species term based on the frequency of the term's occurrence;
determining whether a species term should be rendered based on a comparison of its weight with the weight of the other species terms; and
rendering a species term responsive to the determination.

* * * * *